United States Patent [19]

Gotcher et al.

[11] 4,353,961

[45] Oct. 12, 1982

[54] SHAPED ARTICLE FROM CROSSLINKED FLUOROCARBON POLYMER

[75] Inventors: Alan J. Gotcher, Sunnyvale; Paul B. Germeraad, Palo Alto, both of Calif.

[73] Assignee: Raychem Corporation, Menlo Park, Calif.

[21] Appl. No.: 9,120

[22] Filed: Feb. 2, 1979

Related U.S. Application Data

[60] Division of Ser. No. 833,185, Sep. 14, 1977, Pat. No. 4,155,823, which is a continuation-in-part of Ser. No. 731,352, Oct. 12, 1976, abandoned.

[51] Int. Cl.³ ........................... C08J 3/28; B32B 15/20
[52] U.S. Cl. ............................... 428/380; 204/159.17; 204/159.2; 264/22; 524/409; 525/276
[58] Field of Search ...................... 204/159.17, 159.20; 525/276; 428/380

[56] References Cited

U.S. PATENT DOCUMENTS

| | | | |
|---|---|---|---|
| 3,137,674 | 6/1964 | Marans et al. | 427/44 |
| 3,269,862 | 8/1966 | Lanza et al. | 204/159.2 |
| 3,580,829 | 5/1971 | Lanza | 204/159.17 |
| 3,738,923 | 6/1973 | Carlson et al. | 204/159.2 |
| 3,763,222 | 10/1973 | Aronoff et al. | 204/159.17 |
| 3,840,619 | 10/1974 | Aronoff et al. | 525/276 |
| 3,846,267 | 11/1974 | Tabata et al. | 204/159.17 |
| 3,894,118 | 7/1975 | Aronoff et al. | 525/276 |
| 3,911,192 | 10/1975 | Aronoff et al. | 428/379 |
| 3,923,621 | 12/1975 | Murayama et al. | 525/276 |
| 3,933,773 | 1/1976 | Foerster | 525/276 |
| 3,947,525 | 3/1976 | Robertson et al. | 204/159.17 |
| 3,970,770 | 7/1976 | Dhami | 428/379 |
| 3,985,716 | 10/1976 | Dhami | 427/44 |
| 3,988,502 | 10/1976 | Patel et al. | 526/18 |
| 3,995,091 | 11/1976 | Dhami | 428/379 |
| 4,031,167 | 6/1977 | Aronoff et al. | 204/159.17 |
| 4,039,631 | 8/1977 | Robertson et al. | 525/276 |
| 4,141,874 | 2/1979 | Oka et al. | 525/276 |

FOREIGN PATENT DOCUMENTS

| | | |
|---|---|---|
| 891546 | 3/1962 | United Kingdom . |
| 1117118 | 6/1968 | United Kingdom . |
| 1284459 | 8/1969 | United Kingdom . |
| 1280653 | 7/1972 | United Kingdom . |
| 1332259 | 10/1973 | United Kingdom . |
| 1349282 | 4/1974 | United Kingdom . |
| 1436889 | 5/1976 | United Kingdom . |

OTHER PUBLICATIONS

Odian et al. "Radiation Crosslinking-;" Journal of Polymer Science: Part A, vol. 2, pp. 2835–2848, (1964).
"The Effect of Polyfunctional Monomers on Radiation Crosslinking of Polyethylene"; Yegorova et al., Poly. Sci. USSR, 9, 1624–32, (1967).

Primary Examiner—John C. Bleutge
Assistant Examiner—A. H. Koeckert
Attorney, Agent, or Firm—Lyon & Lyon

[57] ABSTRACT

Melt-processable fluorocarbon polymer compositions requiring high temperature processing can be highly crosslinked by exposure to radiation after post-extrusion incorporation of at least one of certain crosslinking agents. These polymer compositions can be crosslinked to exceptionally high levels affording polymeric materials of improved mechanical properties at elevated temperatures, especially when utilized in wire constructions.

16 Claims, 3 Drawing Figures

SHAPED ARTICLE FROM CROSSLINKED FLUOROCARBON POLYMER

This is a division of application Ser. No. 833,185, filed Sept. 14, 1977 now U.S. Pat. No. 4,155,823. which is a continuation in part of application Ser. No. 731,352 filed Oct. 12, 1976 now abandoned.

BACKGROUND OF THE INVENTION

1. Field of Invention

This invention relates to melt-processable, radiation crosslinkable, fluorocarbon polymer compositions.

2. Description of the Prior Art

It has been proposed to irradiate fluorocarbon polymers to improve their mechanical properties at elevated temperatures. Suitable ionizing radiation includes gamma rays and accelerated electrons. As a rule, degradation, rather than crosslinking, predominates when fluorocarbon polymers are subjected to ionizing radiation. It has also been proposed to heat anneal such polymers subsequent to irradiation to improve their mechanical properties. It also has been reported that a small amount of an unsaturated compound such as triallyl cyanurate (TAC) functions in fluorocarbon polymers as a crosslinking promoter when such formulations are exposed to radiation. The prior art teaches that incorporation of these agents in polymers above a critical concentration, usually about 4% by either melt mixing or by imbibition does not lead to a further increase in crosslink density upon subsequent irradiation.

It has also been reported that fluorocarbon polymer compositions containing relatively volatile crosslinking promoters such as triallyl cyanurate or its isomer, triallyl isocyanurate, cannot be processed, such as by extrusion or injection molding, when the fluorocarbon polymer composition requires a processing temperature above about 250° C. For a variety of fluorocarbon polymers, temperatures above 250° are required to fabricate shaped articles such as wire insulation, sheets, film, tubing, gaskets, and boots. Melt processed polymer compositions containing prior art crosslinking agents tend to prematurely crosslink and to form gels or lumps, discolor and often to form voids in the final product. As set forth in detail in U.S. Pat. Nos. 3,763,222, 3,840,619; 3,894,118; 3,911,192; 3,970,770; 3,985,716; 3,995,091, and 4,031,167, substantial difficulty has been experienced in providing heat stable crosslinking agents of low volatility suitable for use with fluorocarbon polymers. There is no known crosslinking agent which provides entirely satisfactory properties in melt processed irradiated fluorocarbon polymer compositions.

SUMMARY OF THE INVENTION

Melt-processable fluorocarbon polymer compositions requiring processing temperature above about 200° especially above about 250° are rendered radiation crosslinkable by incorporation of crosslinking agents such as triallyl isocyanurate into the fluorocarbon polymer composition after melt fabrication but prior to exposure to radiation. Such a process affords, after exposure to radiation, colorless, void-free polymer compositions useful as shaped articles, especially wire constructions, which exhibit enhanced mechanical properties both at room and at elevated temperatures.

The process by which the improved crosslinked fluorocarbon polymer shaped articles of the present invention are produced entails the following steps:

A. The fluorocarbon polymer, which may optionally contain suitable additives such as pigments, antioxidants, flame retardants, thermal stabilizers, acid acceptors, processing aids and the like, but which need not and preferably will not contain any crosslinking agent is melt processed by known means, as for example extrusion, injection molding, transfer molding, etc., into the desired shape. Since no crosslinking agent is ordinarily present in the polymer composition during melt fabrication, this operation can be carried out at significantly higher temperatures than would be considered feasible by the prior art.

B. The shaped article is immersed in a melt or solution of a crosslinking agent or mixture of crosslinking agents so as to cause the crosslinking agent(s) to be imbibed (i.e., absorbed and diffused) into the shaped article at a temperature below the melt processing temperature of the polymer. In general, the higher the temperature of the imbibition fluid, the more rapid and complete is the uptake of crosslinking agent by the shaped article. In forming procedures where the shaped article is quenched, e.g., during wire coating, a particularly advantageous procedure entails the use of the imbibition fluid or solution as a quenching bath. Under such circumstances a suitable amount of crosslinking agent is rapidly imbibed into the wire jacket which is then subjected to radiation induced crosslinking.

An alternative, although not presently preferred embodiment of the process, entails introduction of at least a portion of the crosslinking agent into the polymer prior to melt fabrication. Especially when using a low molecular weight crosslinking agent, significant loss of the crosslinking agent frequently arises due to evaporation during melt fabrication. Such losses can be replaced by the previously described imbibing technique.

C. The shaped article, having imbibed a suitable concentration of crosslinking agent, is exposed to a dose of radiation sufficient to provide a satisfactory degree of crosslinking without degrading the base fluorocarbon polymer. A radiation dose in the range of about 2–40 megarads, preferably 3–20 megarads, most preferably 5–10 megarads, is generally suitable to provide the desired degree of crosslinking.

DETAILED DESCRIPTION OF THE INVENTION

Fluorocarbon polymers which may advantageously be utilized in the described process include, for example, homopolymers, copolymers, and terpolymers such as ethylene-tetrafluoroethylene copolymers (ETFE polymers), ethylene-chlorotrifluoroethylene copolymers, vinylidene fluoride homopolymers, tetrafluoroethylene-vinylidene fluoride copolymers, tetrafluoroethylenehexafluoropropylene copolymers, vinylidene fluoride-hexafluoropropylene copolymers, vinylidene fluoride hexafluoroisobutylene copolymers, vinylidene fluoride-hexafluoropropylene tetrafluoroethylene terpolymers and mixtures of any of the above. A fluorocarbon polymer as that term is used herein may be further defined as a polymeric chain which contains by weight more than about 10 percent fluorine. The melting point of a polymer composition as that term is used herein is defined as that temperature above which no crystallinity exists in the major crystalline component contained in the polymer composition. Fluorocarbon polymers which may advantageously be utilized in the present invention have melting points above about 200°. Additionally, if the polymer composition comprises essentially no crystalline material the melting point of a polymer composition is further defined as that temperature at which the polymer composition has a viscosity of not more than about $2 \times 10^6$ poise. The majority of polymeric compositions useful in the practice of the present invention have a viscosity of less than about $10^5$ poise at temperatures above the melting point.

Preferred crosslinking agents include those wherein the molar percentage of carbon-carbon unsaturated groups is greater than 15, more preferably greater than 20, and most preferably greater than 25. Preferred agents include triallyl cyanurate (TAC), triallyl isocyanurate (TAIC), triallyl trimellitate, triallyl trimesate, tetraallyl pyromellitate, and also those agents set forth in the U.S. Patents cited in the Description of the Prior Art, the disclosures of which are incorporated herein by references.

It is preferred that at the time of irradiation the fluorocarbon polymer composition contains from about 0.5 to about 30.0% of effective crosslinking agent, more preferably 2.0 to 20.0%, most preferable 5.0 to 15.0%.

Figure 1:
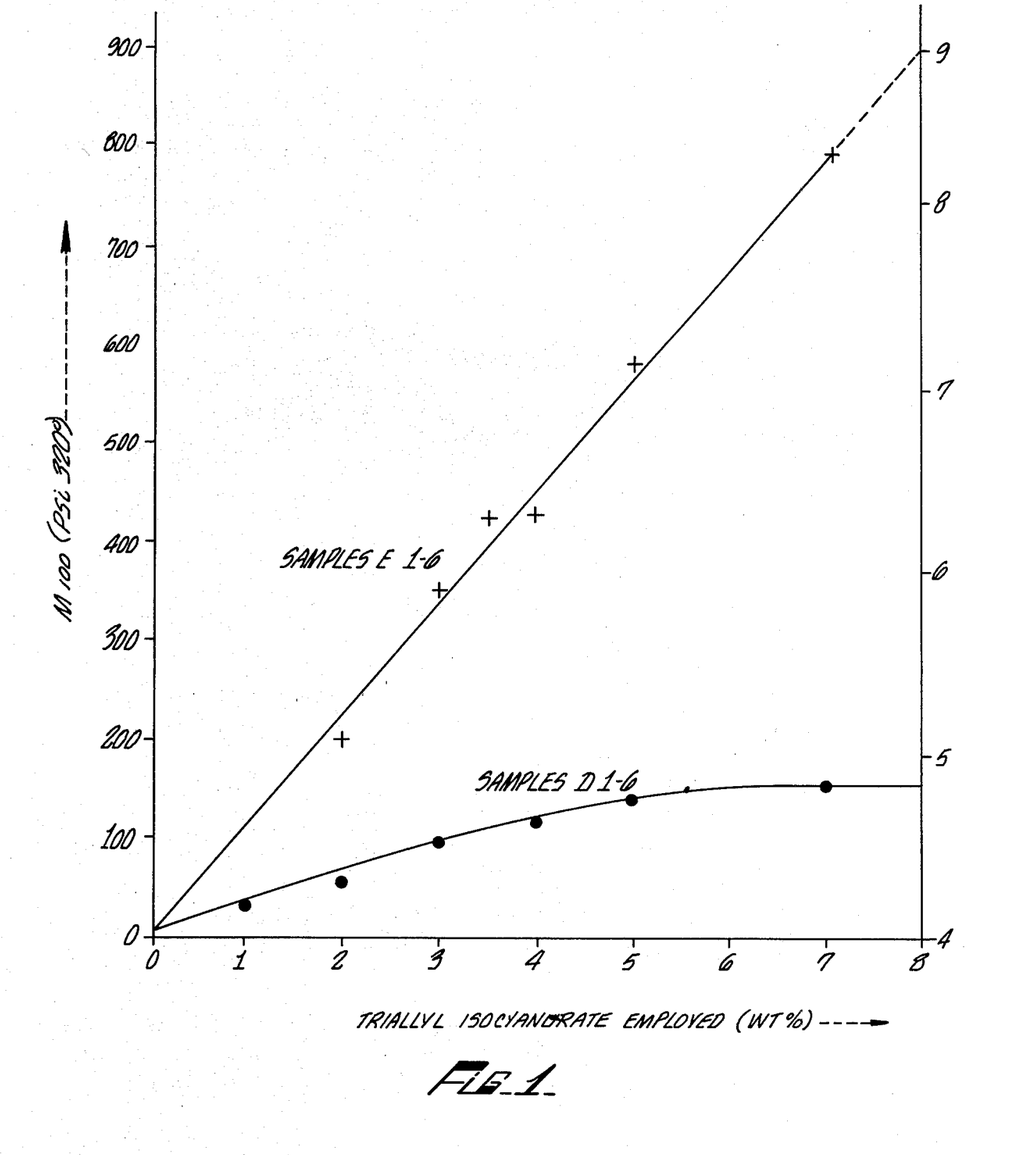
FIG. 1 is a graph illustrating the performance comparison for ETFE polymer formulations prepared by prior art melt mixing (samples D 1–6 in which the TAIC concentration is that contained in the formulation prior to melt processing) and the novel post extrusion inhibition process (samples E 1–6) of the instant invention.

The procedure for incorporation of crosslinking agents into polymeric substrates although similar superficially to the one described by Marans et al. in U.S. Pat. No. 3,137,674, is critically different. The prior art has used an imbibition technique for convenience in preparing radiation grafted or crosslinked polymer mixtures. The prior art has not, however, recognized the utility of the procedure as a means of incorporating large quantities of thermally unstable or highly volatile crosslinking agents into polymeric substrates at temperatures above room temperature but below the required processing temperature of the polymeric formulation. We have found that incorporation of these large quantities of crosslinking agents followed by sufficient irradiation to crosslink the polymer produces an unexpected and dramatic improvement in the mechanical properties of the crosslinked fluorocarbon polymer at both room and elevated temperatures. Prior art investigators have clearly shown that incorporation of crosslinking agents into a variety of non-fluorocarbon polymers by imbibing or melt mixing to above a concentration of about 4% did not lead to further increases of crosslink density for a given dose of irradiation. Odian et al., in J. Poly. Sci. A2, 2835 (1964) have shown that imbibition of allyl methacrylate into polyethylene provided enhancement of crosslink densities only up to a monomer concentration of about 4%. Further increases in monomer concentrations were specifically indicated to be ineffective in producing higher crosslink densities. Similar observations were reported by Yegorova et al. in Poly. Sci. USSR, 9, 1624 (1967) for triallyl cyanurate imbibed or melt mixed with polyethylene which was subsequently irradiated. It was, therefore, most surprising to find that imbibition of significantly large quantities of crosslinking agents (i.e., >5%) into fluorocarbon polymers followed by irradiation led to substantial increases in crosslink density and unexpected improvements in mechanical properties, especially since there is prior art (e.g., U.K. Pat. No. 1,280,653) which teaches that radiation has little or no beneficial effect on these properties with fluorocarbon polymers. This unexpected finding is clearly demonstrated in FIG. 1 (Example V) which relates the concentration of crosslinking agent employed to crosslink density and cut through resistance measurements conducted at 150°.

A shaped article can be immersed in a melt or solution of a crosslinking agent or mixtures of the same so as to cause the agents to be imbibed into the shaped article at a temperature well below that required for melt processing of the polymer. The use of imbibing solutions is particularly applicable to high melting crosslinking agents. Suitable solvents include chloroform, chlorobenzene, dioxane, trichlorobenzene and most other halogenated and ethereal solvents such as tetrahydrofuran, dioxane or diglyme. Alternatively, with a reasonably volatile crosslinking agent, the shaped article can be contacted with the crosslinking agent in vapor form at atmospheric or above atmospheric pressure to effect the imbibing.

One of the many shaped article products which is particularly benefited by the practice of the instant invention is primary wire, that is, a conductor (ordinary copper) having extruded thereover a single or multiple layers of fluorocarbon polymer, radiation crosslinked in accordance with the teaching of the present invention. Specifically, a particularly advantageous construction involves extrusion of first a layer of polymer which can be, for example, ETFE polymer, over a copper conductor. This single coated wire may then be quenched in or otherwise caused to imbibe a suitable amount of a crosslinking agent and subsequently irradiated. The coated, imbibed and irradiated wire is then caused to make a second pass through an extruder head and a second outer jacket of ETFE polymer or other fluorocarbon polymer applied thereover. Optionally, a layer, as for example of adhesive, may suitably be coated onto the first inner jacket prior to applying the second, outer jacket thereover. After application, the outer jacket can likewise be caused to imbibe the same or different crosslinking agent followed by irradiation to induce crosslinking. Details of the fabrication of dual jacketed wire constructions in general are known in the art and are set forth, for example, in U.S. Pat. No. 3,269,862.

We have unexpectedly found that even with a dual jacket construction the post extrusion imbibing of crosslinking agent is effective in incorporating sufficient amounts of crosslinking agent into both the inner and outer layers. That is, two layers of polymer insulation which contain no crosslinking agents can be sequentially extruded over a conductor and the wire then caused to imbibe a crosslinking agent and irradiated. Using this procedure, both the inner and outer insulation layers will be effectively crosslinked simultaneously. Alternatively, as above indicated, the inner layer can be applied, caused to imbibe the same or a different crosslinking agent and then both layers simultaneously caused to crosslink by exposure to radiation. Little evaporation or degradation of the crosslinking agent present in the first, inner jacket occurs during the application of this second layer because of the very limited time said crosslinking agent is exposed to elevated temperatures during the second extrusion.

Further aspects and details of the present invention are set forth in the following examples which illustrate the advantages resulting therefrom. Certain of these tests utilized in the examples are first described. The term wire can connote either bared conductor or jacketed conductor as the context requires. All tests, unless otherwise indicated, were carried out under ambient conditions, and all temperatures are reported in degrees Celcius.

In all of the illustrative examples of the present application the polymer forming operations, e.g., wire extrusion, were carried out under conditions such that for at least part of the time the polymer was above its melting point.

SCRAPE ABRASION TEST

A length of wire is rigidly mounted under tension in a jig and a weighted 90° wedge shaped knife blade having a 5 mil radius at the knife edge is then mounted crosswise to the wire with the knife edge resting on the wire. The knife edge can be loaded with varying weights (3 lbs in all the examples given) to increase the bearing force of the blade on the wire. To test the scrape abrasion resistance of a given wire the blade is reciprocated with a 2" stroke longitudinally along the wire at a rate of 120 strokes (i.e., 60 cycles) per minute. Failure occurs when the knife edge contacts the conductor causing an electrical circuit to close.

FLAMMABILITY TEST

The flammability tests were performed in a sheet metal cabinet conforming to FED-STD-191, method 5903 as follows: Two inches of insulation were removed from one end of an 18-inch specimen and the specimen was mounted vertically under tension with the bared conductor angularly disposed from the vertical so as to enable the Bunsen burner to be mounted vertically directly under the test specimen. A 1.5-inch high yellow flame from a Bunsen burner was applied to the specimen at the junction of the insulation and the bare conductor in such a manner that the lower end of the insulation was located 0.75 inches into the flame. After 12 seconds of flame application, the burner was removed from below the specimen and immediately turned off. The burn length and the time of burning after removal of the flame are recorded. The burn length was the distance from the original bend made in the conductor to the farthest point of damage. Damage is signified by bared conductor, i.e., conductor having the insulation burnt off and/or charred insulation.

CROSSED-WIRE ABRASION TEST

The test involves rubbing two crossed wires against each other at a rate of 50 Hz in a controlled manner, thereby simulating the chafing action that can occur for example in high-vibration areas of aircraft.

The test utilizes a small vibration tester that is rigidly mounted on a heavy steel frame so that the axial driver motion is in a horizontal plane. The axial driver is coupled to a rocker arm through a spring steel rod. A curved specimen holder is mounted on the rocker arm. The radius of curvature of this specimen holder is such that the upper surface of the specimen forms an arc whose center is located at the center of rotation of the rocker arm. Therefore, as the specimen is displaced horizontally, it does not have any vertical movement.

The second (upper) specimen is mounted on the underside of a beam which is fastened to the frame through a thin strip of a damping alloy that acts as a hinge and allows the beam to be displaced only in a vertical direction.

The beam and the movable specimen holder are positioned so that each of the wires forms an angle of 30° with the axis of the axial driver. Therefore, the included angle between the crossed wires is 60°. As the lower specimen is driven, the symmetrical arrangement about the driver axis results in a wear pattern that is substantially the same for both specimens. Any other angle would still provide substantially equal wear patterns as long as the axial driver move along the bisector of the included angle.

The force between the wires is provided by a rubber band that serves as a bungee. The actual force is measured with a Hunter force gauge. Force measurements are made before and after each test by varying a threaded tension adjustment until the upper specimen separates from the lower specimen. A microscope is used to determine the point of separation.

Figure 3:
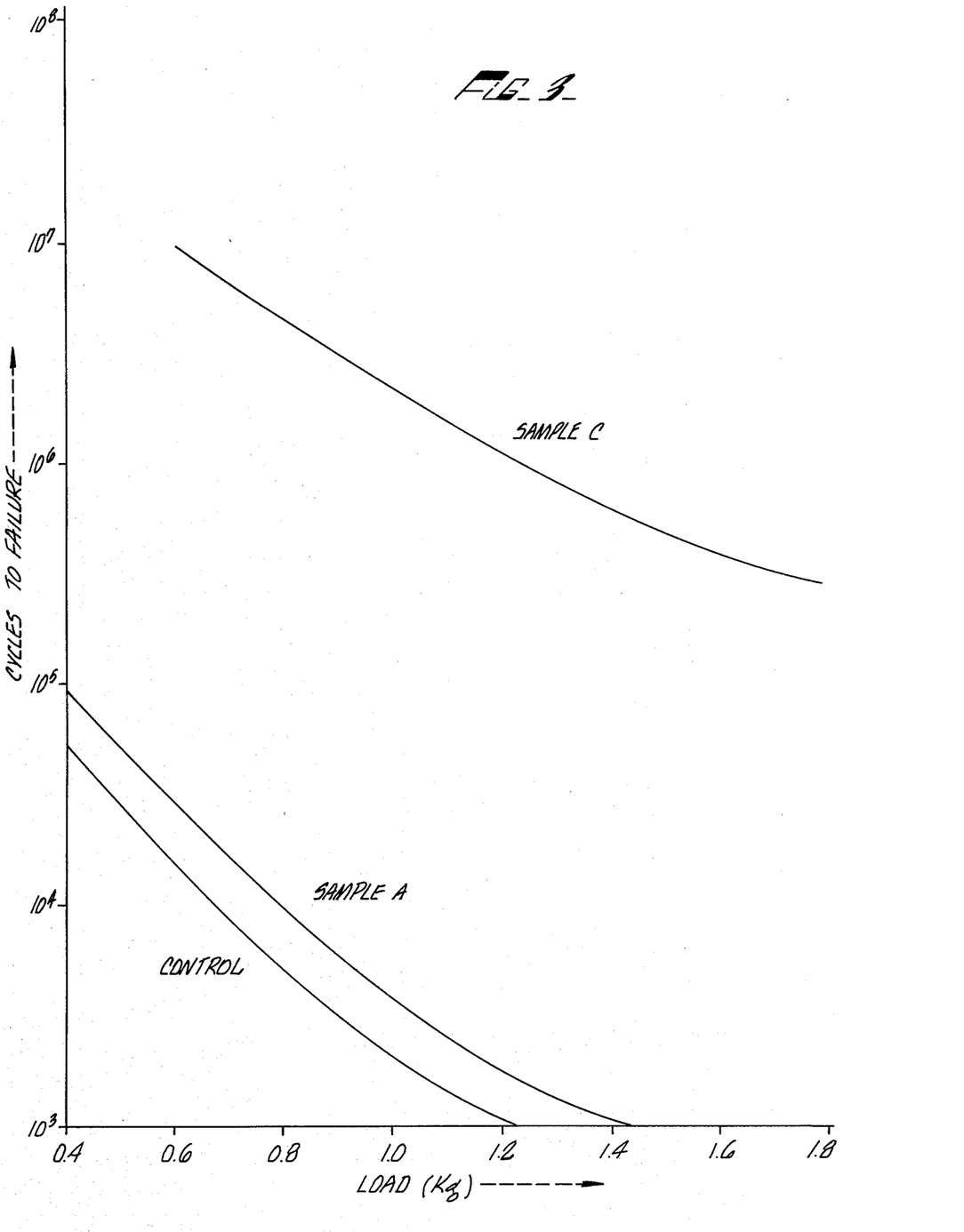
FIG. 3 illustrates crossed wire wear resistance of single wall 20 AWG insulation at three levels of crosslinking. Prior art: control, $M_{100}=0$ psi; sample A, $M_{100}=258$ psi. Present invention: sample C, $M_{100}=720$ psi.

The graph (FIG. 3) discussed in Example VII shows the effect of the applied force on the wear resistance (cycles to failure) for samples of wire made according to the prior art and according to the present invention. As is apparent, wire insulated with ETFE polymer compositions and made in accordance with the teaching of the present invention provides greater wear resistance at any of the applied force levels tested than wire having ETFE insulation made according to the prior art.

CUT THROUGH TEST

A sample of the wire is laid between an anvil and a 90° included angle wedge shaped weighted knife blade having a 5 mil flat with 5 mil radius edge. The anvil is hung by means of a stirrup from the load cell of an Instron Tensile tester and the knife blade mounted on the movable bar of said Tensile tester so that the blade edge lies transversely over the wire specimen. The knife edge is advanced towards the wire conductor at a speed of 0.2 inches per minute. Failure occurs when the knife edge contacts the conductor. The resulting electrical contact causes the tensile tester to stop advancing the blade. The peak reading from the load cell is taken to be the cut through resistance of the wire.

MODULUS MEASUREMENT

To determine the relative level of crosslinking in the reported polymer compositions, a modulus test conducted at 320° was used. This modulus test measures the stress required to elongate a resin by 100% at a temperature of 320°, i.e., above the melting point of the polymer composition. High values obtained from this test indicated increased resistance to elastic deformation, that is, a greater degree of crosslinking. The modulus measurement expressed as the M100 value can be calculated by:

$$M_{100} = \frac{\text{stress in pounds to elongate sample by 100\%}}{\text{initial cross-sectional area in square inches}}$$

Should the sample rupture prior to 100% elongation, the M100 is calculated using the equation:

$$M_{100} = \frac{\text{stress in pounds to elongate sample by 100\%}}{\text{elongation at rupture} \atop \text{initial cross-sectional area in square inches}}$$

In the following examples, monomer contents in the compositions of the examples were calculated from the nitrogen content of the blends determined by the Kjeldahl method.

EXAMPLE I

This example demonstrates the undesirable gel, color, and void formation resulting from the melt processing of prior art fluorocarbon polymer formulations containing crosslinking agents. The melt processability of several polymer compositions was compared by extrusion of a standard formulation containing various crosslinking agents to produce a thin wall (10 mil) ETFE insulation (e.g., Du Pont's Tefzel 280) on 20 AWG tin plated copper conductors and examination of the resultant wire (Table I). As is apparent from this Table, thin wall wire insulation obtained by extruding prior art fluorocarbon polymer compositions containing crosslinking agents demonstrate deficiencies such as discoloration, porosity, gelation, and surface imperfections.

TABLE I

Behavior of Several Crosslinking Agents in a Standard Formulation[1]

| Crosslinking Agent | Extrusion Temp. Profile, ° | | | | Extruded Insulated Properties | | |
|---|---|---|---|---|---|---|---|
| | Zone 1 | Zone 2 | Zone 3 | Head | Color | Surface Appearance | Integrity |
| None | 265 | 310 | 330 | 350 | clear | smooth | excellent |
| triallyl cyanurate | 265 | 310 | 330 | 330 | tan | v. rough | foamed |
| triallyl isocyanurate | 265 | 310 | 330 | 330 | tan | v. rough | foamed |
| triallyl trimellitate | 245 | 295 | 330 | 340 | tan | rough | foamed |
| diallyl-4,4'-diphenylether dicarboxylate | 265 | 310 | 335 | 345 | off white | lumps | good |
| diallyl ester of phenyl indan | 240 | 300 | 340 | 350 | off white | lumps | good |

[1]4.0 Wt. % crosslinking agent concentration in ETFE polymer (Tefzel 280) for all samples at start of processing.

EXAMPLE II

To further illustrate the undesirable behavior of crosslinking agents of the prior art when exposed to temperatures above about 275°, a variety of crosslinking agents was selected for evaluation. The thermal polymerization temperature, that is the temperature at which these crosslinking agents alone undergo thermally induced polymerization (Tp) was evaluated by differential scanning calorimetry at a heating rate of 20°/minute under a nitrogen atmosphere. The volatility of each crosslinking agent was compared either by thermogravimetric analysis using a heating rate of 20°/minute under a nitrogen atmosphere, or by isothermogravimetric analysis, which measures the weight loss below the polymerization temperature, i.e., at 175° under a nitrogen atmosphere. These comparisons are summarized in Table II. Examination of this Table clearly shows that undesirable characteristics, such as volatility and thermal polymerization, occur in prior art crosslinking agents upon exposure to temperatures above about 250° which temperatures are required to process the more useful fluorocarbon polymers.

TABLE II

| Crosslinking Agent | Polymerization Temperature,° | Volatility | |
|---|---|---|---|
| | | % Loss on heating to 300° | % Loss 30 minutes at 175° |
| triallyl cyanurate | 220 | 100 | 41.3 |
| triallyl isocyanurate | 250 | 100 | 87.6 |
| triallyl trimesate | 260 | 37 | 4.3 |
| triallyl trimellitate | 250 | 54 | 10.9 |
| m-phenylene maleimide | 230 | 11 | 4.4 |
| diallyl-4,4'-diphenylether dicarboxylate | 260 | 24 | 3.5 |

EXAMPLE III

This example provides a property comparison between wire products obtained by the present invention process and those manufactured according to the prior art. When carrying out the prior art process, great care was taken to use the lowest extrusion temperature profile possible in order to obtain the best quality extrudate.

A blend of Tefzel 280 (94.8%), TAIC (5%) and titanium dioxide (0.2%) was extruded and pelletized from a ¾" extruder (melt temp. 320°) and then extruded over a conductor as in Example I to form an insulated wire (Sample A) which had a measured TAIC content of 1.9%. In a repeat experiment using 5% TAIC, the insulated wire (Sample B) was found to have a TAC content of 3.3%. Another composition containing Tefzel 280 (99.8%) and a titanium dioxide pigment (0.2%) was extruded over a conductor and immersed in TAIC at 203° for 5 minutes. This insulated wire (Sample C) was found to have a TAIC content of about 4.5%. Samples A, B, and C were irradiated to 15 megarads and annealed as before. A comparison of the physical properties of A and B (not made in accordance with the instant invention) with Sample C (made in accordance with the instant invention) is given in Table III.

Examination of these data shows that the crosslinked wire insulation made by the process of the instant invention (Sample E) to exhibit substantially greater mechanical properties at room temperature and a 150° as measured by cut through and scrape abrasion tests that the wire having insulation crosslinked according to the prior art.

TABLE III

| Samples | Crosslinking Agent Conc. in Insulation | | Wall Thickness mils | Tensile Strength psi | $M_{100}$ 320° psi | Cut Through | | Scrape Abrasion 23° cycles |
|---|---|---|---|---|---|---|---|---|
| | Theoretical | Measured | | | | 23° lbs | 150° lbs | |
| A | 5% | 1.9% | 9.0 | 8180 | 258 | 27 | 4.4 | 36 |
| B | 5% | 3.3% | 9.5 | 8245 | 218 | 27 | 5.1 | 22 |
| C | 4.5% | 4.5% | 10.0 | 8470 | 501 | 62 | 7.8 | 86 |

EXAMPLE IV

To demonstrate the unexpected importance of the crosslinking agent concentration in the polymeric shaped article and its resultant effect on the level of crosslinking and polymer reinforcement obtained after irradiation, sequential imbibition of fluorocarbon polymer (ETFE) compression molded slabs was made. Five compression molded slabs (Tefzel 280, mold temperature 320°) were prepared and weighed. Four of these slabs were imbibed for 2 minutes at 210° with triallylisocyanurate and irradiated to 5 megarads. One slab was annealed at 150° for 20 minutes in a forced air oven and the uptake of crosslinking agent was determined. The remaining three slabs were imbibed under similar conditions, again removing one slab for subsequent annealing and weight uptake measurements. This procedure was repeated twice again. The resulting crosslinking agent uptake and the effect of such high concentrations on elevated temperature mechanical properties is presented in Table VII. This table clearly shows that an unexpected and commercially important level of elevated temperature mechanical strength has been achieved with the compositions of the instant invention. TABLE IV. Sequential Imbibition of ETFE Compression Molded Slabs with Triallylisocyanurate

| Slab Number | % Weight Uptake | $M_{100}$ (psi, 320°) |
|---|---|---|
| *1 | 0 | melts |
| 2 | 4.9 | 152 |
| 3 | 13.7 | 1360 |
| 4 | 17.5 | 3160 |
| 5 | 22.0 | 6630 |

*Not in accordance with the instant invention.

EXAMPLE V

To further demonstrate the unexpected importance of high concentration levels of crosslinking agent in the polymer formulated and its resultant effect on the extent of crosslinking and polymer reinforcement obtained after irradiation, wire samples containing different quantities of crosslinking agent were prepared by the imbibition technique (similar to Sample C of Example III) or by extrusion (similar to Sample A of Example III) so as to compare the resultant insulation properties obtained after irradiation. Samples were prepared by immersing six portions of ETFE polymer containing 0.2% titanium dioxide insulated wire into a TAIC bath containing a small amount of thermal stabilizer at 200° for predetermined lengths of time (0.5, 2, 3, 4, 5, and 10 minutes, respectively) to allow different concentrations of crosslinking agent to diffuse into the insulation. As a result of these immersions, the insulations were found to have absorbed 1.8, 2.9, 3.5, 4.0, 4.9, and 7.5 wt % TAIC. These insulated wires were irradiated to a dose of 8 megarads and annealed at 150° for 30 minutes. In a separate experiment, wire samples (not in accordance with the present invention) were prepared by extruding six different formulations. These formulations, containing a blend of titanium dioxide (0.2%) and TAIC (1, 2, 3, 4, 5, and 7% respectively) in Tefzel 280 powder, were extruded over conductor as in Example I to form insulated wires, and irradiated to 8 megarads and annealed at 150° for 30 minutes. A comparison of the resultant levels of crosslinking (M100) between these latter wire samples (samples D 1-6) and the above indicated wire samples made in accordance with the instant invention (samples E 1-6) is given in FIG. 1. The results shown in this figure clearly demonstrate that an unexpected and commercially important level of polymer crosslinking and polymer toughening was achieved in the wire samples prepared in accordance with the instant invention. Wire samples prepared according to the prior art do not exhibit elevated temperature cut through values above about 5 lbs at 150° while wire samples prepared according to the present invention demonstrate, in the same test, values of up to about 9 lbs at 150°. This unexpected improvement in elevated temperature mechanical performance of these wire samples is a result of substantially higher crosslink concentrations obtained from the present invention.

EXAMPLE VI

This example shows the unexpected improvement in mechanical properties obtained from the instant invention in achieving sufficiently high levels of crosslinking and polymer reinforcement.

Figure 2:
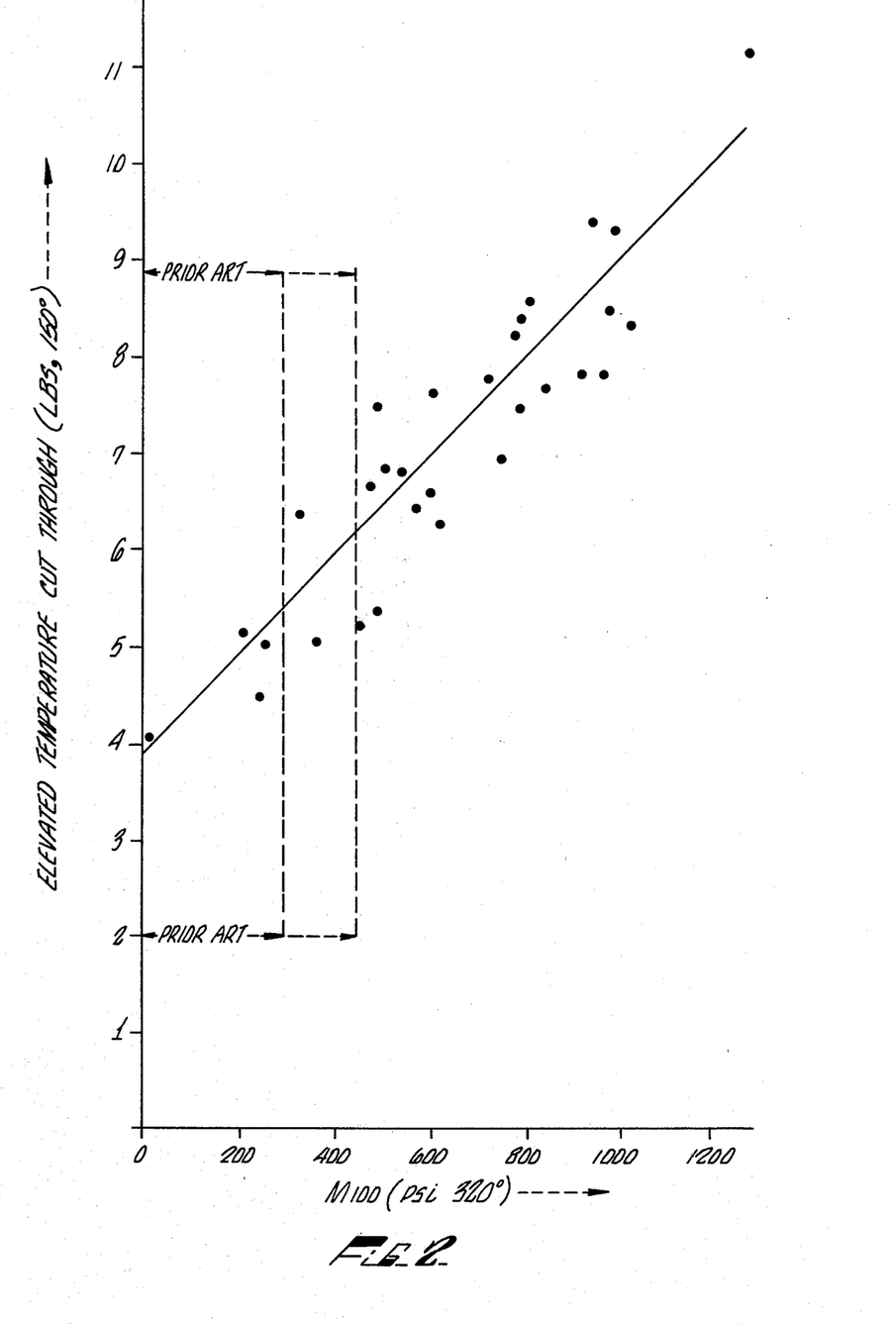
FIG. 2 illustrates elevated temperature cut through resistance as a function of crosslinking level.

The crosslinking density of 30 samples of 10 mil 20 AWG wire insulation was varied up to an M100 value of 1100 psi by irradiation of ETFE polymer formulations containing progressively increasing amounts of TAIC imbibed by the process of the instant invention. The cut through resistance of these insulations measured at 150° is depicted in FIG. 2 in relationship to the respective M100 value. It is apparent from these data that a cut through resistance equal to or greater than 7 lbs can only be achieved with an M100 value exceeding 300 psi.

EXAMPLE VII

To demonstrate further the practical and commercial importance of the instant invention, samples of wire made according to prior art (noncrosslinked control and crosslinked Sample A of Example III) and in accordance with the instant invention (Sample C of Example III) were evaluated in the Crossed Wire Abrasion Test. The results obtained are compared in FIG. 3 which clearly illustrate the significant improvement of crosslinked wire insulation resulting from uncommonly high levels of crosslink density.

EXAMPLE VIII

Wires A, B, and C of Example III were strung between supports 36" apart and subjected to a current overload of 40 amps for one minute. Wires A and B melted or split and fell off the conductor during this test, demonstrating, as in the previous tests, undesirable service characteristics, while Wire C maintained its insulative integrity. Although the insulation of Wire C turned brown during the current overload test, it remained flexible and could subsequently be wrapped around a 1X mandrel without cracking. These particular comparisons indicate that at sufficiently high crosslink levels, the overload resistance performance of the insulated wires prepared in accordance with the instant invention are dramatically improved in comparison with prior art wires.

EXAMPLE IX

A 20 flat conductor flat cable was constructed by pressure extruding, over 24 AWG flat copper conductors, a composition containing Tefzel 280 (87.3%), Tefzel 210 (4%), titanium dioxide (1%), TAIC (7%) and Irganox 1010 antioxidant (0.7%), the cable and insulation being quenched in a water bath mounted 2 inches from the die. The flat cable insulation was found to contain 3% of TAIC. In a second experiment the water bath was replaced by a bath of TAIC containing thermal stabilizers maintained either at room temperature or at 190°. With a room temperature TAIC quench the cable insulation was found to contain about 5% TAIC while with a 190° TAIC quench the insulation was found to contain more than 6% TAIC. Samples of the resultant flat cable after irradiation to 12 megarads were found to be highly crosslinked and exhibit outstanding insulation properties.

EXAMPLE X

To illustrate the undesirable behavior of prior art crosslinked fluorocarbon polymer compositions when exposed to a flaming environment, four ETFE polymer formulations were prepared and extruded over 20 AWG conductor to form a thin wall (10 mil) wire insulation. Sample F, utilizing a composition containing 99.8% Tefzel 280 and 0.2% titanium dioxide, and sample G, utilizing a composition containing 95.8% Tefzel 280, 0.2% titanium dioxide and 4% antimony trioxide, were prepared by extrusion and irradiation to 15 megarads. Sample H, utilizing a composition containing 99.8% Tefzel 280 and 0.2% titanium dioxide, and sample J, utilizing a composition containing 96.8% Tefzel 280, 0.2% titanium dioxide and 3% antimony trioxide, were prepared by extrusion, imbibed with TAIC at 205° for 2 minutes, irradiated to 15 megarads and annealed at 150° for 1 hr. These four samples of wire were subjected to the vertical flammability test, and further tested in an NMB smoke chamber in accordance with FAA test procedure. The results are reported in Table V.

As this Table indicates, an unexpected flammability problem, heretofore unrecognized to those skilled in the art of crosslinking fluorocarbon polymers, is observed. The use of antimony oxide in fluorocarbon polymer compositions would not be expected to significantly alter the flammability characteristics of ETFE polymers, especially when these polymers are recognized in the art to be self-extinguishing. We have unexpectedly found that the use of antimony oxide alone drastically reduces the flammability behavior of crosslinked ETFE polymer compositions as to make these compositions self-extinguishing.

TABLE V

| Flammability of Selected Dual Wall Wire Insulations. | | | | | |
|---|---|---|---|---|---|
| Sample | $Sb_2O_3$ % | Smoke Generation, $D_s$ 2 min. | Smoke Generation, $D_s$ 4 min. | Distance Burned in. | Afterburn sec. | Remarks |
| F | 0 | 10 | 59 | 2 | 2 | drips-conductor bared |
| G | 4 | — | — | 2 | 2 | drips-conductor bared |
| H | 0 | 20 | 82 | 8 | 36 | no flow, chars conductor insulated |
| J | 3 | 7 | 29 | 2 | 0 | no flow, chars conductor insulated |

We claim:

1. A shaped article comprising an irradiation crosslinked fluorocarbon polymer, said polymer having a melting point prior to crosslinking of at least 200°, said article having been subjected to at least one forming operation at a temperature in excess of the melting point of said polymer prior to being crosslinked and thereafter crosslinked by ionizing radiation at a dose level of up to about 30 megarads, said copolymer containing from at least about 4.0 to about 30.0 wt. % of cross-linking agent at the commencement of said radiation, and having an M100 at 320° of at least about 450 psi following radiation.

2. An article in accordance with claim 1 wherein said polymer contains from about 4.0 to about 12.0 wt. % of crosslinking agent.

3. An article in accordance with claim 2 wherein said copolymer contains from about 6.0 to about 10.0 wt. % of crosslinking agent.

4. An article in accordance with claim 1 wherein said crosslinking agent is selected from the group consisting of triallylcyanurate, triallyl isocyanurate, triallyl trimellitate, triallyl trimesate, tetraallyl pyromellitate, diallyl diphenyl ether dicarboxylate and the diallyl ester of 1,1,3-trimethyl-5-carboxy-3-(p-carboxyphenyl) indan and mixtures thereof.

5. An article in accordance with claim 1 wherein said crosslinking is effected by radiation at a dose level of about 2 to about 30 megarads.

6. An article in accordance with claim 1 wherein said fluorocarbon polymer is an ethylene tetrafluoroethylene copolymer or terpolymer containing from about 35 to 60 mole percent ethylene, from about 35 to 60 mole percent tetrafluoroethylene and up to about 10 mole percent of at least one additional copolymerizable comonomer.

7. An article in accordance with claim 1 wherein said radiation crosslinked polymer is an insulating material.

8. An article in accordance with claim 7 wherein said article is a wire construction comprising at least one electrical conductor with at least one irradiation crosslinked ethylene-tetrafluoroethylene polymer insulating layer surrounding at least a portion of said conductor.

9. An article in accordance with claim 8 wherein said wire construction comprises a conductor, at least a portion of said conductor being surrounded with inner and outer insulating layers both of said layers comprising radiation crosslinked ethylene tetrafluoroethylene polymer.

10. An article in accordance with claim 1 wherein said radiation crosslinked polymer contains from about 0.5 to about 6.0 weight percent of antimony oxide.

11. An article in accordance with claim 8 wherein said polymer layer contains from about 0.5 to about 6.0 weight percent of antimony oxide.

12. An article in accordance with claim 8 wherein said insulating layer has crossed-wire abrasion resistance of at least about $2 \times 10^4$ cycles at 1.0 Kg load.

13. An article in accordance with claim 12 wherein said insulating layer has crossed-wire abrasion resistance of at least about $2 \times 10^5$ cycles at 1.0 Kg load.

14. An article in accordance with claim 1 wherein said polymer following radiation has an M100 at 320° of at least about 600 psi.

15. An article in accordance with claim 14 wherein said polymer following irradiation has an M100 at 320° of at least about 600 psi.

16. An article in accordance with claim 9 wherein both said copolymer layers contain antimony oxide.

* * * * *

UNITED STATES PATENT AND TRADEMARK OFFICE
CERTIFICATE OF CORRECTION

PATENT NO. : 4,353,961

INVENTOR(S) : Gotcher et al.

DATED : October 12, 1982

It is certified that error appears in the above-identified patent and that said Letters Patent is hereby corrected as shown below:

Column 7, line 1, after "sample" replace "by 100%" by --to rupture--.

Signed and Sealed this

Twenty-seventh Day of February, 1996

Attest:

BRUCE LEHMAN

*Attesting Officer*  *Commissioner of Patents and Trademarks*